United States Patent [19]

Teubler et al.

[11] 3,744,509
[45] July 10, 1973

[54] THREE WAY FLOW REGULATING VALVES

[75] Inventors: Heinz Teubler, Bad Homburg; Otto Langosch, Usingen both of Germany

[73] Assignee: Vickers GmbH, Hamburg, Germany

[22] Filed: Nov. 1, 1971

[21] Appl. No.: 194,595

Related U.S. Application Data

[63] Continuation of Ser. No. 4,719, Jan. 21, 1970, abandoned.

[30] Foreign Application Priority Data

Jan. 23, 1969 Germany................ P 19 03 305.7

[52] U.S. Cl.............................. 137/117, 137/101
[51] Int. Cl............................................ F16k 31/12
[58] Field of Search................. 137/100, 101, 116.3, 137/117, 118

[56] References Cited

UNITED STATES PATENTS

| 3,532,104 | 10/1970 | Hoen | 137/117 X |
| 2,980,173 | 4/1961 | Perkey | 137/117 |
| 3,323,533 | 6/1967 | Reimer | 137/118 X |
| 3,334,705 | 8/1967 | Lam | 137/118 X |
| 3,385,311 | 5/1968 | Allen | 137/101 |

*Primary Examiner*—Robert G. Nilson
*Attorney*—Arthur Raisch, John M. Kisselle et al.

[57] ABSTRACT

A flow regulating valve comprises a control piston arranged to be impinged on both ends by a flow and further piston means, connected with the piston and arranged to be acted upon by the flow substantially statically so that the force on the second piston substantially represents the static flow pressure.

1 Claim, 2 Drawing Figures

PATENTED JUL 10 1973 3,744,509

Inventor:
HEINZ TEUBLER
OTTO LANGOSCH
BY
Barnes, Kisselle, Raisch & Choate
ATTORNEYS 3,744,509

THREE WAY FLOW REGULATING VALVES

This is a continuation of U.S. Pat. application Ser. No. 4,719, filed Jan. 21, 1970, now abandoned.

The present invention relates to three way flow regulating valves and more particularly to such valves of the type comprising a valve plunger or piston, whose one first side is impinged on by a main flow to be regulated and on an opposite second side is acted upon by a branch flow coming from the inlet chamber.

Such three way flow regulating valves, which for example are mounted in the cover of a liquid pump, can be used to ensure that when the speed of drive, and consequently the output flow of the pump change, a varying branch flow is split off in such a manner that a substantially constant main flow is provided. In the case of a previously proposed three way flow regulating valve of the above-mentioned type the action of the split off branch flow on the valve piston or plunger could not produce a sufficiently constant main flow owing to hydrodynamic effects.

One object of the invention is to overcome this shortcoming.

In accordance with one aspect the present invention consists in a three way flow regulating valve, comprising means defining an inlet chamber, a valve piston, the valve piston being arragned to be acted upon on a first side by a main flow to be regulated, while an opposite second side of the piston is acted by a branch flow leaving the inlet chamber, and means defining an additional direct connection for transferring the static pressure of the inlet chamber to the last-mentioned second side of the piston. In this respect the invention takes account of the fact that in the case of a varying pumped flow the branch also varies correspondingly and therefore in acting upon the valve piston in known constructions produces spurious effects, which are attributable to changing pressure relationships.

In order to ensure satisfactory operation of the static pressure obtaining in the inlet chamber on the valve piston or plunger, the invention makes the further proposal that for transmitting the full static pressure a connecting duct should extend between the inlet chamber and a region, separated from the branch flow, on the second side of the piston, no or only a slight, insignificant flow obtaining in this connecting duct.

Preferably this measure is provided by arranging for a valve land to separate the second side of the piston, on which the branch flow acts, from the region in which the connecting duct opens.

In accordance with a further advantageous feature of the invention a further improvement or effect of or on the regulating characteristic of the valve can be obtained by making the connecting duct in the form of a slot whose outlet port is controlled by the valve land in order to influence the regulating characteristic of the valve, dependent on the position of the valve piston.

A further development of the invention bringing about an effect on or improvement in optimum regulating characteristics and optimum dynamic behavior resides in that the valve land has a passage joining the two regions on the second side of the piston and cooperating with the connected duct.

A further improvement in the regulating characteristic of the valve is achieved by the invention in that the additional connecting duct between the inlet chamber and the second side of the piston is matched with the corss-sectional control of a main flow opening on the first side of the piston.

The invention is now described with reference to an embodiment as shown in the attached drawing.

Figure 1:
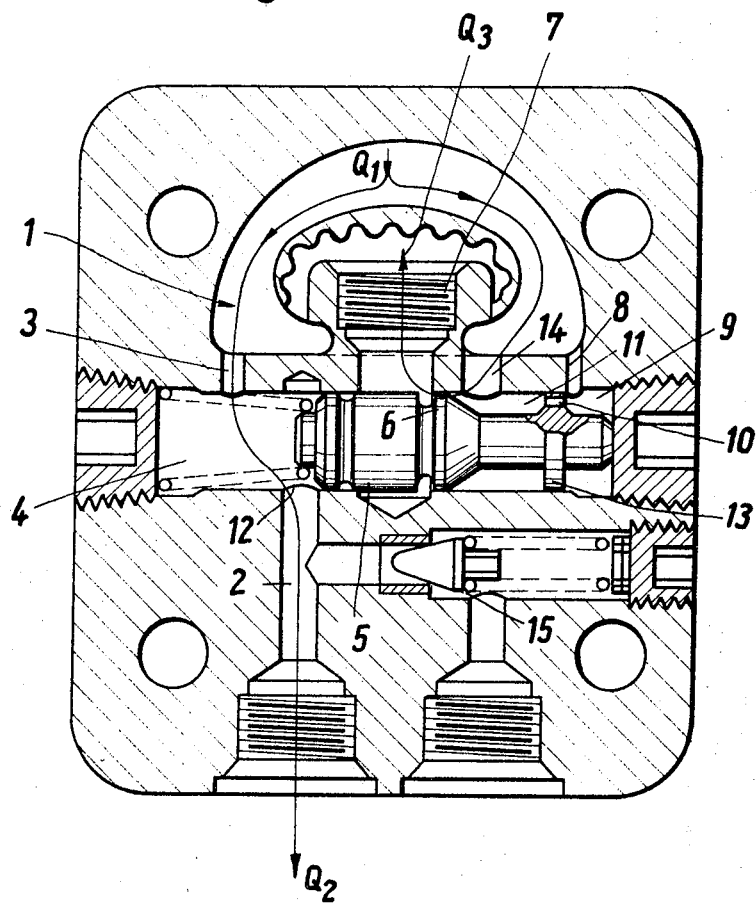
FIG. 1 is a cross-section through a three way flow regulating valve constructed in accordance with the invention.

In FIG. 1 a three way flow regulating valve is shown, which splits a pump output flow $Q_1$ into a main flow $Q_2$ which is to be regulated to the greatest possible extent, and a branch flow $Q_3$. The regulating valve can be used with the advantage in the cover of a liquid pump, in order to ensure that, despite variation in the driving speed, the pump delivers the main flow $Q_2$ at a substantially constant rate.

In the inlet chamber 1 the pump output flow $Q_1$ assumes a static pressure which depends on the load at the connection for the main flow $Q_2$ or the load at the branch flow $Q_3$. The main flow $Q_2$ passes from the inlet chamber 1 to an outlet duct or passage 2 via a choke-like connecting hole 3 and an intermediate chamber 4, from which the outlet passage 2 extends. The intermediate chamber 4 is limited on one side by a valve piston or plunger 5 so that the left-hand (or first) side of the piston is impinged upon by the main flow $Q_2$ flowing through the intermediate chamber 4. In the intermediate chamber 4 a helical spring is arranged which urges the piston 5 to the right in terms of FIG. 1. The outlet passage 2 is so arranged that its inlet port 12 leading into the chamber 4 is changed in size by the front part of the piston 5 as the latter moves.

The branch flow $Q_3$ ($=Q_1-Q_2$) leaves the inlet chamber 1 via the duct 14 and passes into a chamber 11 on the rear (or second) side of the valve piston 5 and from this position via a choke opening 6, controlled by this piston 5, to the outlet 7 for the branch flow $Q_3$.

Owing to the cross-sectional relationships the flow velocity of the branch flow $Q_3$ in the chamber 11 is above that in the inlet chamber 1, so tha the effective pressure which in the chamber 11 acts on the rear or second side of the piston 5 is reduced and thus is not capable, with the parts of the arrangement so far specifically described of providing the desired regulation of the output or main flow $Q_2$. In order to transmit the static pressure in the inlet chamber 1 to the rear of second side of the valve plunger or piston 5, an additional connecting duct 8 is provided. This connecting duct transfers the static pressure in the inlet chamber 1 to a chamber 9 which is separate from the chamber 11 through which the branch flow $Q_3$ passes, no or only a slight flow movement occurring in the connecting duct 8. In order to separate the chambers 9 and 11 on the second or rear side of the piston 5 a land 13 is provided on an extension of the piston 5. This land cooperates with the bore of the hole in which the piston slides in forming the separate chambers 9 and 11.

The piston land 13 (which can be considered to form a further piston) and the connecting duct 8 may be preferably so arranged in relation to each other that the port at the outlet end of the connecting duct 8 is controlled by the valve land 13. This leads to an effect on the regulation characteristic of the valve in accordance with the position of the valve piston 5. Furthermore the land 13 is provided with a passage 10 which connects the chambers 9 and 11 so that owing to the cooperation with the connecting duct 8 in the case of only a slight flow optimum features are achieved as regards the regulation characteristic and dynamic behavior. For this purpose the connecting duct 8 and/or the passage 10 in the land 13 can be matched to suit the choke 3 in the main flow $Q_2$. This is achieved by providing an extension or shoulder, not shown, on the front side of the valve piston 5 which controls the free cross-section of the connecting hole 3. In additions a pressure limiting valve 15 can be provided which can be of entirely conventional construction and is therefore not described in any detail.

Referring to FIG. 1, pressure is sensed in cavities 4, 11 and 9. Flow into cavity 4 is restricted by the controlled flow orifice 3. No flow will go out the secondary port until pump delivery exceeds what can be put through orifice 3. The spring offset on the spool accomplishes this.

When pump delivery is increased, pressure builds up in cavities 11 and 9 because of the resistance to flow through orifice 3. This causes the spool to shift toward cavity 4. The amount of spool shift is proportional to the pressure differential between cavities 4 and 9.

Flow from the primary port is held to an almost constant volume, as determined by orifice 3, and the metering action of the spool at the area of the left of spool 5. Flow to the secondary port varies with pump delivery. All flow not going out the primary port is diverted to the secondary port through the metering area past land 6.

Figure 2:
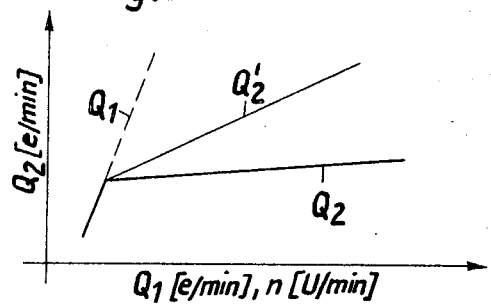
FIG. 2 illustrates the regulating characteristic of the valve.

FIG. 2 shows the relationship between the pump output flow $Q_1$ and the regulated main or out flow $Q_2$. While $Q_2'$ denotes the main flow, previously found to be unsatisfactory, of the three way flow regulating valve without the duct 8 and the land 13, the course of $Q_2$ indicates that the feature of the invention a substantially constant regulated main current or flow $Q_2$ is available despite an increase in the magnitude of the pumped flow using the land 13 and the duct 8. Furthermore the matching of the valve duct 8 to suit the passage 10 and additionally the connecting hole 3 brings about a substantial effect on the regulaing characteristic of the three way flow regulating valve in order to be able to meet the most varied practical requirements.

We claim:

1. A three way flow regulating valve, comprising a housing, a piston sliding in a hole in the housing, said housing having an inlet chamber to which an input flow is directed, first and second inlet duct means associated respectively with the first and second sides of the piston for splitting up the input flow in the inlet chamber into two flows impinging on opposite first and second sides of the piston, respectively, the flow on the first side passing to an output duct, while the flow on the second side passing out through a further outlet duct, port means cooperating with the piston for enabling the piston to regulate the flow on its first side, means biasing the piston, said second duct means from said inlet chamber to said second side of said piston having at least a portion of reduced cross section such that the velocity of the fluid on the second side of the piston is increased and the pressure of the fluid on said second side of the piston is decreased, a land on the piston on the second side of the latter and cooperating with the hole in the housing in defining two chambers, the first chamber being between the land and the piston and having fluid directed thereto by said second duct means, and the second chamber being on the other side of said land, an additional duct in the housing extending from said inlet chamber to said second chamber and providing an additional direct fluid connection for the static pressure of the inlet chamber to the second side of the piston, said valve land being provided with a passage through it connecting the two chambers.

* * * * *